United States Patent [19]

Swenson

[11] 4,251,794
[45] Feb. 17, 1981

[54] FLEXIBLE LINEAR THERMAL ARRAY

[75] Inventor: Richard C. Swenson, Carriere, Miss.

[73] Assignee: The United States of America as represented by the Secretary of the Navy, Washington, D.C.

[21] Appl. No.: 101,965

[22] Filed: Dec. 10, 1979

[51] Int. Cl.³ .............................................. H01C 7/04
[52] U.S. Cl. ..................................... 338/26; 338/22 R
[58] Field of Search .................. 338/26, 22 R, 22 SD, 338/25, 13; 73/342, 362 AR; 29/612; 340/584; 174/72 R

[56] References Cited

U.S. PATENT DOCUMENTS

| 2,792,481 | 5/1957 | Wood | 338/26 |
| 2,796,455 | 6/1957 | Jones | 338/26 X |
| 3,163,703 | 12/1964 | McLoad | 338/26 X |
| 3,380,304 | 4/1968 | Zysk et al. | 73/342 |
| 3,396,357 | 8/1968 | Borg et al. | 338/26 |

Primary Examiner—C. L. Albritton
Attorney, Agent, or Firm—Richard S. Sciascia; Harvey A. David

[57] ABSTRACT

A flexible cable type of linear thermal array is constructed of a bundle of insulated conductor pairs enclosed in a braided aramid fiber strength layer through which individual pairs are withdrawn at intended thermistor stations and the end portions thereof loosely caged in the lumens of thermoplastic tubes. After an outer layer of thermoplastic fiber is braided over the bundle and tubes openings are formed through the outer layer and tubes, the wire end portions withdrawn, thermistors connected thereto and reinserted in the tube lumens.

10 Claims, 7 Drawing Figures

FLEXIBLE LINEAR THERMAL ARRAY

BACKGROUND OF THE INVENTION

This invention relates to instrumented cables and more particularly to condition sensing cables such as are used to determine physical conditions in the ocean or other medium.

Condition sensing cables having a linear array of electrical instruments incorporated on or in the cable have been used in collecting data on, or monitoring of, conditions of temperature, pressure or the like, in large bodies of water. Similarly, temperature sensing cables have been used to maintain surveillance of temperatures at various levels in large masses of particulate material, for example grain in a storage elevator.

Measurements of ocean temperature gradients are obtained by suspending a cable through the zone of measurement, which cable is provided with a plurality of temperature sensors, usually thermistors, spaced therealong. Each thermistor usually requires a pair of wires and accordingly the cable usually comprises a bundle of insulated wire pairs, equal in number to the number of thermistors.

A variety of prior art temperature sensing cables have been known. However, they have generally included heavy strength members in an effort to prevent stretching and breakage of wires and molded plastic or rubber sheaths in the interest of protection against a hostile environment and also against damage during shipboard handling and deploying. Because the measurement zones of interest have been expanded to require sensing cables of 1000 meters or more in length that can be towed from a ship or suspended for extended periods from a buoy or float, the prior art cables of the just mentioned constructions have proven to be too heavy, stiff and unwieldy to be practical. In addition, they have generally been unable to withstand the jerking motions imposed by wave actions on the buoys.

A considerable measure of improvement has been achieved in the construction of thermistor array cables which are more flexible and light in weight by providing a bundle of wire pairs bound together by a suitable frapping, fishing a wire pair from the bundle at each sensing station, connecting the leads of a thermistor to the wires, coating the thermistor and its connections with a potting compound in a bulge at the side of the bundle, and then running the bundle through as rope braiding machine to weave a tightly braided cover of nylon, aramid fiber, or other plastic material over the bundle and thermister bulges to provide a finished thermistor array or cable.

Experience has shown, however, that although such a cable is superior to its predecessors, some of the thermistors will be damaged or connections broken either in passage through the braiding machine or due to flexing and jerking in use.

SUMMARY OF THE INVENTION

With the foregoing in mind, it is a principal object of this invention to provide an improved condition sensing cable of the type having instrumentation stations spaced therealong.

Another object of this invention is the provision of a more reliable inexpensive, and serviceable linear thermal array for oceanographic data gathering.

As another object this invention aims to provide a temperature sensing cable device of the foregoing character that is easily fabricated and results in a durable yet flexible cable construction of light weight and great resistance to damage from wave action.

Yet another object is to avoid the shortcomings and many of the undue mechanical complexities of the prior art instrumented cables.

Still another object is to provide a novel and improved method of making a flexible, linear, thermal or other condition sensing array that can have its thermistors or other condition sensing elements installed or removed easily in order to avoid damage during construction, tailor the array to a particular need, or make substitutions of elements.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
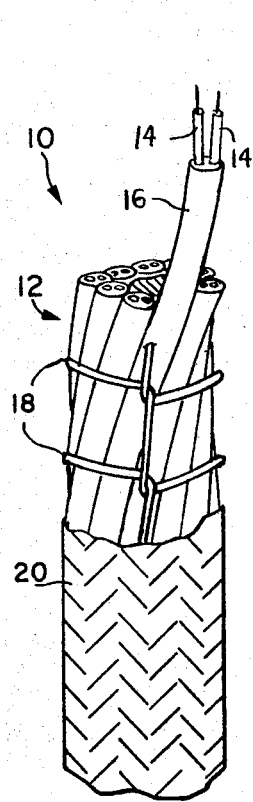
FIG. 1 is a side view, with portions broken away, illustrating a segment of a bundle of wire pairs and a strength imparting layer at one stage of manufacture of a flexible linear thermal array embodying the invention.

The invention may best be understood by following a description of a method of manufacture and a resulting flexible linear thermal array. Referring to FIG. 1, a bundle 10 is provided comprising a plurality of conductor pairs, generally indicated at 12, each including two electrically insulated wires 14 within an insulating and protective coating or jacket 16. The jackets 16, and insulation of the wires 14 therein, are conveniently color coded to assist in identification. The bundle of conductor pairs 12 is secured by a light binding or frapping 18. The conductor pairs 12 equal in number the largest number of instrument stations the finished array or cable is desired to have. It will be understood that the bundle 10 has a length substantially equal to that of the finished array. Moreover, each conductor pair may advantageously terminate substantially at the location of the sensor it is to serve, thereby saving a great deal of weight and expensive wire which would otherwise remain unused and create an extra load on the supporting portions of the array or cable.

Figure 2:
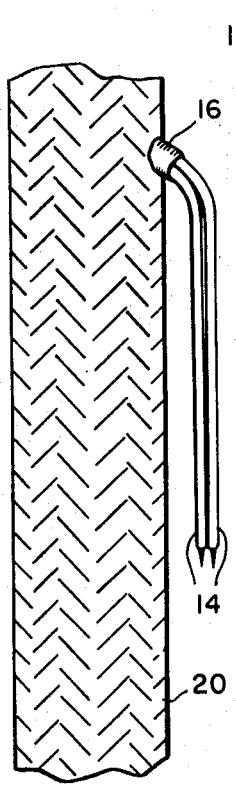
FIG. 2 is a view of bundle segment of FIG. 1 but at another stage in the manufacture of the array.

The bundle 10 is covered with a braided strength imparting layer 20 formed of strands of a suitably stretch resistant synthetic plastic material such as aramid fibers. This strength layer 20 is conveniently formed by passing the bundle 10 through a conventional hollow rope braiding machine. The pick and weave of the layer 20 is such that a conductor pair 12 can be fished from the bundle and pulled through the layer. Referring now to FIG. 2, the step of pulling the free end of a conductor pair 12 through the layer 20 has been accomplished, and the jacket 16 stripped away to expose the wires 14. In the event a free end of the conductor pair is not found at the desired location, it will be understood that a bight of the desired pair is pulled through the layer 20 and severed at the required length.

Figure 3:
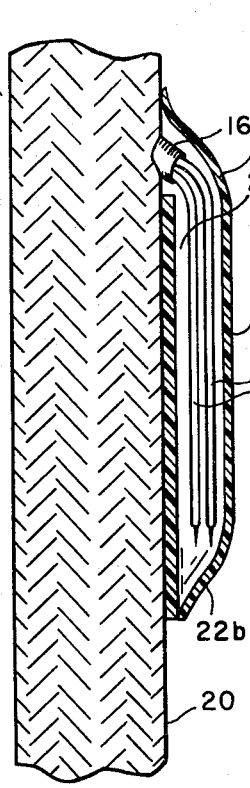
FIGS. 3, 4, and 5 illustrate the same segment at subsequent stages in manufacture of the array.

Turning next to FIG. 3, a section of relatively stiff or rigid theremoplastic tube 22 is slipped over the wires 14 and laid against the side of the covered bundle so as to define a lumen 24 extending parallel to the principal or longitudinal axis of the bundle. The ends of the thermoplastic tube 22 are conveniently pinched or deformed as shown at 22a and 22b to provide a substantially smooth transition with the bundle. The tube 22 may be secured in this position by a small length of adhesive tape, now shown. Similar procedures are carried out at each location along the length of the bundle 10 where it is desired to be able to position a sensor.

Figure 4:
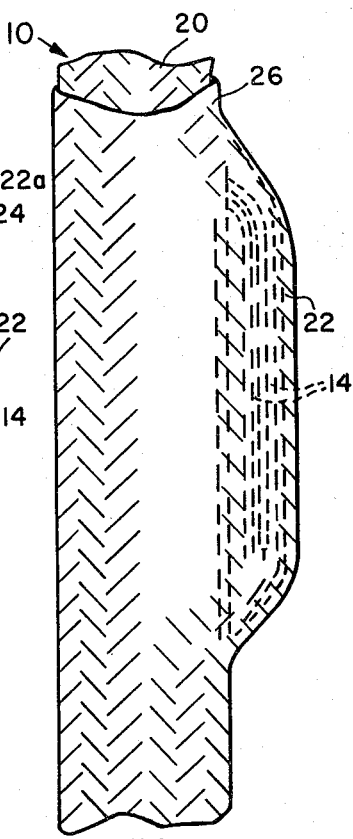

With the tube 22 so positioned, and with the wires 14 loosely caged therein, an outer protective layer 26 is woven or braided thereover to completely enclose the bundle and the tube as shown in FIG. 4. This layer 26 is preferably formed of fibers or strands of an abrasion resistant thermoplastic material such as nylon, and is preferably of a tighter weave than the inner strength layer 20. If desired, anti-strum fairings (not shown) may be attached at the time of braiding of the layer 26.

Figure 5:
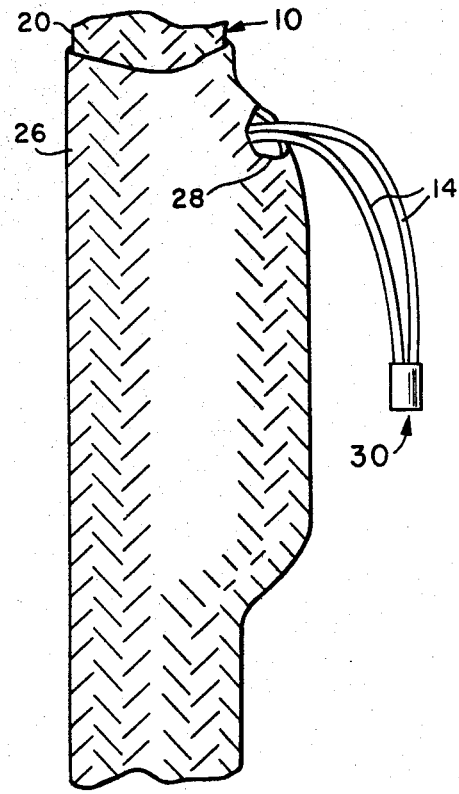

Following application of the protective layer 26, the steps illustrated in FIG. 5 are carried out. More specifically, an opening 28 is made through the layer 16 and the wall of the tube 22 so as to provide access to the wires 14 in the lumen 24 of the tube. The opening 28 is preferably formed by melting through the outer layer 16 and the tube wall with a heated tool such as a soldering iron. Next, the pair of wires 14 are withdrawn from the lumen 24 through the opening 28, as shown, and a temperature sensing unit generally indicated at 30, attached to the ends thereof.

Figure 6:
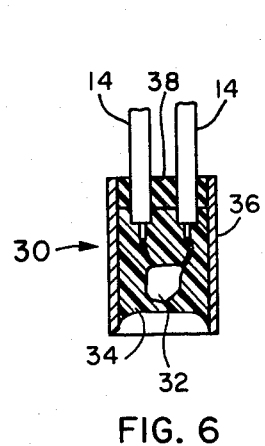
FIG. 6 is an enlarged sectional view of a temperature sensing element of the array.

Referring to FIG. 6, the temperature sensing unit 30 comprises a temperature responsive resistor, or thermistor 32, embedded in a suitable thermally conductive potting compound 34 and housed in a metal can 36. The wires 14 are fixed by an epoxy plug 38, as shown.

Figure 7:
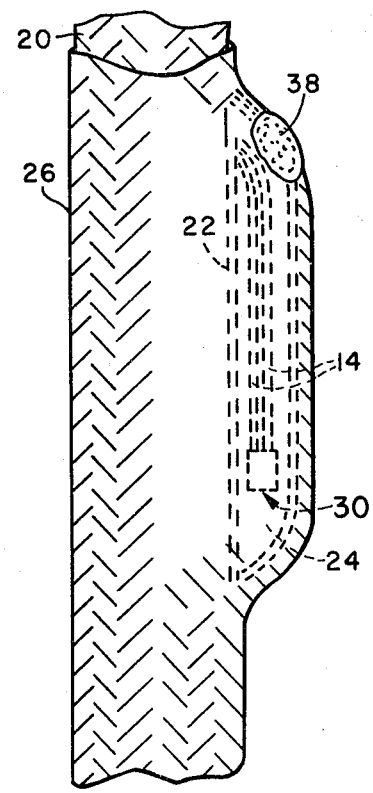
FIG. 7 is an elevational view of a completed segment of the array.

Thereafter, the temperature sensing unit 30, and the attached wires 14 are inserted through the opening 28 into the lumen 24, and the opening is closed by fusion of a patch 38 of thermoplastic material therein as is illustrated in FIG. 7. Similar procedures are carried out at each sensing station along the array length.

Because the wires 14 and sensing units 30 are loosely caged in the respective tubes 22, severe bending or flexing of the array can occur without damage or strain occurring to the thermistors or their connections during use of the array. Moreover, because the sensing units are installed after both passes through the braiding machine have occurred, any possible damage from those operations is avoided.

Of course, the method and construction of this invention permits ready removal, inspection, and replacement of sensing units as the circumstances of use may require.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A flexible, linear, condition responsive array comprising:
   an elongated bundle including a multiplicity of electrical conductor pairs;
   a strength layer of braided synthetic fiber strands formed about said bundle;
   a plurality of tubing sections of predetermined length disposed externally of said strength layer and spaced along the length of said bundle at locations corresponding to condition sensing stations of said array;
   each of a plurality of said conductor pairs having end portions extending outwardly through said strength layer and being loosely disposed in a corresponding one of said tubing sections;
   a protective layer formed around said strength layer and said tubing sections; and
   a plurality of condition sensing means each disposed in a respective one of said tubing sections and connected to said conductor end portions therein.

2. An array as defined in claim 1, and wherein:
   said tubing sections and said protective layer are formed of thermoplastic material, whereby openings can be made by melting therethrough for withdrawal and reinsertion of said conductor pair end portions.

3. An array as defined in claim 2, and wherein:
   said tubing sections are formed with tapered ends whereby said sensing stations are characterized by bulges in the protective layer that merge smoothly with the portions of said array between said sensing stations.

4. An array as defined in claim 3, and wherein:
   said openings, where made, have been closed by fusion of a theremoplastic patch thereover.

5. An array as defined in claim 4, and wherein:
   said condition sensing means comprise temperature responsive resistors.

6. A cable-like flexible linear array having a plurality of sensing stations for measuring thermal gradients in the ocean, said array comprising:
   an elongated bundle including a multiplicity of electrical conductor pairs, each conductor pair comprising a pair of insulated wires;
   a braided, synthetic fiber strength layer formed about said bundle throughout the length thereof, said strength layer comprising strands that have been separated sufficiently to pull a selected one of said conductor pairs outwardly therethrough at each of a plurality of locations along the length of said array corresponding to each of a plurality of said sensing stations;
   a plurality of relatively rigid tubular elements of predetermined length disposed against the outer side of said strength layer at corresponding ones of said plurality of sensing stations, each of said tubular elements defining a lumen extending parallel to the long axis of said array and in which end portions of a corresponding conductor pair is loosely received;
   a plurality temperature responsive sensing means, each connected to a corresponding one of said conductor pairs in the lumen of a corresponding tubular element; and
   a protective layer, formed of a braided synthetic fiber material, in covering relation to said bundle and said tubular elements with said tubular elements forming bulges in said protective layer to one side of said bundle at each of said sensing stations.

7. An array as defined in claim 6, and wherein:
said tubular elements and said protective layer are each formed of thermoplastic material, whereby openings can be made and closed by fusion of said thermoplastic material for removal and insertion of said conductor pairs and of said sensing means from and into said lumens of said tubular elements.

8. An array as defined in claim 7, and wherein:
said sensing means each comprise a temperature responsive resistor connected to said wires, a protective can surrounding said resistor, and potting material disposed in said can in waterproof sealing relation to said resistor and its connections to said wires.

9. A method of manufacturing an elongated, flexible, linear, cable structure for use as a condition responsive array having a plurality of sensing stations spaced therealong, said method comprising:
providing a bundle of predetermined length comprising a multiplicity of substantially parallel insulated conductor pairs, said conductor pairs having predetermined lengths each terminating in an end portion at a location corresponding to one of said sensing stations;
forming a braided strength layer of stranded synthetic material around said bundle throughout the length thereof;
pulling said conductor pair end portions through said strength layer to the exterior thereof;
providing a plurality of thermoplastic tubular elements, each disposed against said strength layer at one of said stations and defining a lumen receiving the corresponding end portion of a conductor pair;
forming a thermoplastic protective layer over said strength layer and said tubular elements;
forming openings by melting through said protective layer for access to selected ones of said conductor pair end portions in said lumens;
withdrawing said selected end portions to the exterior of said protective layer;
connecting a condition responsive element to said selected end portions;
reinserting said selected end portions, with the connected condition responsive elements, into said lumens from which they were withdrawn; and
closing said opening by fusion of said protective layer.

10. A method as defined in claim 9, and wherein:
said protective layer is formed by the step of braiding of stranded thermoplastic material.

* * * * *